: 3,787,590
METHOD FOR SOLUBILIZING TEA CREAM

Bert Borders, Keyport, N.J., Harold Rivkowich, Ossining, N.Y., and Warren C. Rehman, Montvale, N.J., assignors to Tetley, Inc., New York, N.Y.
No Drawing. Filed Jan. 27, 1971, Ser. No. 110,328
Int. Cl. A23f 3/00
U.S. Cl. 426—366          6 Claims

ABSTRACT OF THE DISCLOSURE

An increased yield of tea solubles is obtained by subjecting the insoluble precipitate or tea cream obtained by cooling a dilute tea extract to an oxidizing treatment in the absence of added alkali.

BACKGROUND OF THE INVENTION

Conventional processes for treating tea subject the tea cream obtained by cooling the dilute tea extract to an oxidation treatment in the presence of added alkali at a pH in the range of from 5.5 to 7.5. This oxidation treatment results in additional tea solubles which are recovered and added to the tea extract for further processing.

OBJECTS OF THE INVENTION

It is an object of the present invention to provide an improved, high-yield process for extracting tea. Another object is to improve the yield of soluble solids which may be obtained from a given quantity of tea leaves. A further object is to provide a method for increasing the yield of soluble solids from the tea cream obtained by cooling a dilute liquid tea extract. These and other objects of the present invention will be apparent from the following description.

SUMMARY OF THE INVENTION

Increased yields of soluble tea solids are obtained by subjecting the tea cream which is obtained by cooling a dilute tea extract to an oxidation treatment in the absence of added alkali. As no alkali is added, the oxidation will take place in the range of from about pH 2 to about pH 3.5. Suitable oxidizing agents are hydrogen peroxide, ozone or oxygen.

DETAILED DESCRIPTION

The process of the present invention is applicable to any process for extracting solids from tea leaves. The extract may be obtained by treating any type of tea, such as green, black or oolong tea. The conventional method is to contact the tea with water, generally with water at an elevated temperature. The extraction may be carried out for varying periods of time, for example, from a few minutes to over 30 minutes, typically, from about 5 minutes to about 30 minutes. The extraction may be carried out counter-currently or co-currently in either continuous or batch operations. Whatever the manner of extraction, the result is an aqueous mixture or solution containing various solids extracted from the tea leaves. The spent tea leaves are then separated from the aqueous extract and discarded while the extract is subjected to further treatment, e.g., stripping, desludging, and evaporating.

The liquid extract is then generally subjected to a stripping operation wherein volatiles comprising the "tea essence" are removed and collected for subsequent reincorporation into the tea.

The dilute extract is then cooled under controlled conditions to effect separation of part of the total tea solids as an insoluble precipitate. The solids are then removed from the liquid extract and treated to recover soluble solids therefrom. Conventionally, this treatment comprises an oxidation at a pH within the range of from 5.5 to 7.5, the pH being maintained in this range by the addition of alkali. The soluble solids are added to the liquid tea extract which is then subjected to evaporation to produce a concentrated extract, or concentrated and dried to yield soluble tea solids. Volatiles comprising the tea essence may be added to the concentrated liquid extract.

It has now been found that additional soluble solids may be obtained by subjecting the insoluble precipitate or tea cream which is obtained by cooling the liquid tea extract to an oxidation treatment in the absence of added alkali. As no alkali is added, the oxidation will take place in the range of from about 2 to about 3.5. The oxidizing treatment may be carried out by contacting the insoluble precipitate or tea cream with an oxidizing agent. The oxidizing treatment may comprise contacting the insoluble precipitate or tea cream with an aqueous solution of an oxidizing agent or by passing a gaseous oxidizing agent through an aqueous phase containing the insoluble precipitate or tea cream. Suitable oxidizing agents are hydrogen peroxide, ozone, oxygen, mixtures of ozone and oxygen, ozone and air, oxygen and air, air or mixtures of any of the foregoing gases with other innocuous gases, such as, for example, nitrogen, carbon dioxide or inert gases.

The hydrogen peroxide is present in an amount equal to from about 10% to about 30% by weight of the insoluble precipitate or tea cream, preferably from about 15% to about 25% by weight. Preferably the hydrogen peroxide is employed in the form of a solution containing from about 20% to about 50% hydrogen peroxide. When the oxidizing agent is gaseous, the volume of oxidizing gas, i.e. oxygen or ozone, or both, passed through the aqueous phase containing the insoluble precipitate or tea cream is at least equivalent to the foregoing amount of hydrogen peroxide. It is also possible, if desired, to employ both hydrogen peroxide and a gaseous oxidizing agent.

The oxidizing reaction may be carried out for periods of from about 20 minutes to about 75 minutes at temperatures of from about 88° C. (190° F.) to about 132° C. (270° F.), preferably for a period of from about 40 minutes to about 70 minutes at temperatures of from about 104° C. (220° F.) to about 127° C. (260° F.). After completion of the oxidizing treatment, the mixture is centrifuged to remove insolubles and the remaining liquid is added to the dilute liquid extract.

The steps of extracting the tea leaves, removing volatile tea essence therefrom, cooling the extract to remove insoluble precipitate or tea cream therefrom, concentrating, or concentrating and drying the extract, and adding the volatile tea essence to the concentrated liquid extract may all be carried out according to conventional practice.

Particularly desirable results are obtained when the process of the present invention is combined with the step of subjecting spent tea leaves to an oxidizing treatment to recover soluble tea solids therefrom as disclosed in co-pending application of Harold Rivkowich et al., entitled Method of Extracting Tea, and filed on Dec. 31, 1970, Ser. No. 103,276 which disclosure is hereby incorporated by reference.

The following example illustrates the invention without, however, limiting the same thereto.

EXAMPLE

Eight pounds of tea and 202 lbs. of water at a temperature of about 88° C. (190° F.) are charged to an atmospheric extractor. After 20 minutes, 175 lbs. of liquid extract containing 2.8 lbs. of soluble solids are withdrawn and are passed to a stripper wherein volatiles which comprise the tea "essence" are removed and recovered for subsequent addition to the process stream.

The liquid effluent from the stripper is passed to a settling tank where the temperature is reduced to below 7° C. (45° F.) for from 45-90 minutes. The resulting insoluble precipitate or tea cream which forms is separated by centrifuging.

To 100 parts by weight of tea cream (containing 60.8 parts by weight of solid matter and 39.2 parts by weight of water) there are added 40 parts by weight of a 30% solution of hydrogen peroxide and 450 parts by weight of water. The resulting mixture is autoclaved at 240° F. at 50 p.s.i.g. The pH of the mixture is 3.2. After 60 minutes the mixture is removed from the autoclave and centrifuged. Liquid effluent (480 parts by weight) containing 31.7 parts by weight of solubilized tea cream are recovered from the centrifuge. Wash water (400 parts by weight) at a temperature of 190° F. is added to the 109 parts by weight of liquid and tea cream remaining in the centrifuge and the resulting mixture is again centrifuged. Liquid effluent (410 parts by weight) containing 18.0 parts by weight of solubilized tea cream are recovered from the centrifuge. The mixture remaining in the centrifuge contains 66.7 parts by weight of tea cream having a solids content of 10.6 parts by weight. This tea cream is discarded. Of the total tea cream (60.8 parts by weight) 49.7 parts by weight are solubilized for a total tea cream recovery of 81.6%.

The liquid effluents recovered from the centrifuging steps are evaporated in conventional manner to form a concentrated liquid extract. The volatiles from the stripper are added to this concentrated extract. The concentrated extract is then spray dried to form soluble tea solids.

COMPARATIVE EXAMPLE

Eight pounds of tea are treated as described in the first two paragraphs of the preceding example.

To 120 parts by weight of tea cream (containing 61.4% by weight of solid matter and 38.6% by weight of water) there are added 96 parts by weight of a 30% solution of hydrogen peroxide, 504 parts by weight of water, and 6 parts by weight of potassium hydroxide. The resulting mixture having a pH of 5.5 is autoclaved at 250° F. After 60 minutes the mixture is removed from the autoclave and centrifuged. Liquid effluent (586 parts by weight) containing 36.7 parts by weight of solubilized tea cream are recovered from the centrifuge. Wash water, 240 parts by weight at a temperature of 190° F., is added to the liquid and tea cream remaining in the centrifuge and the resulting mixture is again centrifuged. Liquid effluent (299 parts by weight) containing 15.2 parts by weight of solubilized tea cream are recovered from the centrifuge. The mixture remaining in the centrifuge contains 78 parts by weight of tea cream having a solids content of 31.4% or 24.5 parts by weight of solids. Of the total tea cream (73.7 parts by weight), 51.9 parts by weight are solubilized for a total tea cream recovery of 68%.

The liquid effluents recovered from the centrifuging steps are evaporated in conventional manner to form a concentrated liquid extract. The volatiles from the stripper are added to this concentrated extract. The concentrated extract is then spray dried to form soluble tea solids.

Although the operating conditions are more rigorous in this comparative example in that a higher concentration of hydrogen peroxide is employed and in that a slightly higher temperature is employed during autoclaving, the tea cream recovery is uniformly lower than in the preceding example wherein no alkali is employed.

What is claimed is:

1. A method for obtaining tea solubles from tea cream consisting essentially of heating to a temperature of about 190° F. to about 270° F. a mixture consisting essentially of tea cream, water and an oxidizing agent at a pH of from about 2 to about 3.5 for a period of from about 20 minutes to about 75 minutes.

2. A method according to claim 1 wherein the heating is carried out for a period of from about 40 minutes to about 70 minutes.

3. A method according to claim 2 wherein the mixture is heated to a temperature of about 220° F. to about 260° F.

4. A method according to claim 1 wherein the oxidizing agent is selected from the group consisting of hydrogen peroxide, ozone, oxygen, air, a mixture of ozone and oxygen, a mixture of ozone and air, and a mixture of oxygen and air.

5. A method according to claim 4 wherein the oxidizing agent is hydrogen peroxide, the hydrogen peroxide being present in a quantity of from about 10% to about 30% by weight of the tea cream.

6. A method according to claim 5 wherein the quantity of hydrogen peroxide is from about 15% to about 25% by weight of the tea cream.

References Cited
UNITED STATES PATENTS

| | | | |
|---|---|---|---|
| 2,831,772 | 4/1958 | Herz | 99—77 |
| 3,484,248 | 12/1969 | Graham et al. | 99—76 |
| 3,151,985 | 10/1964 | Fobes | 99—76 X |
| 3,451,823 | 6/1969 | Mishkin et al. | 99—77 |
| 3,163,539 | 12/1964 | Barch | 99—77 |

FRANK W. LUTTER, Primary Examiner

S. L. WEINSTEIN, Assistant Examiner